United States Patent

Switchenbank et al.

[15] 3,700,732
[45] Oct. 24, 1972

[54] N-(1,1-DIMETHYL-2-BUTYNYL)-3,5-DICHLOROBENZAMIDE

[72] Inventors: Colin Switchenbank, Parkasie; Kenneth L. Viste, Warminster, both of Pa.

[73] Assignee: Rohn and Hass Company, Philadelphia, Pa.

[22] Filed: March 26, 1969

[21] Appl. No.: 810,814

[52] U.S. Cl..................260/558 D, 71/79, 71/87, 71/88, 71/93, 71/94, 71/92, 71/100, 71/105, 71/111, 71/113, 71/115, 71/116, 71/117, 71/118, 71/120, 71/121, 71/122, 71/123, 71/124, 260/558 R
[51] Int. Cl.............................................C07c 103/30
[58] Field of Search.....................................260/588

[56] References Cited

UNITED STATES PATENTS

| | | | |
|---|---|---|---|
| 3,272,844 | 9/1966 | Easton et al. | 260/551 |
| 3,534,098 | 10/1970 | Horrom II | 260/558 |
| 3,481,979 | 12/1969 | Horrom et al. | 260/558 |

FOREIGN PATENTS OR APPLICATIONS

| 6,800,322 | 7/1968 | Netherlands | 260/558 |
|---|---|---|---|

*Primary Examiner*—Henry R. Jiles
*Assistant Examiner*—Harry I. Montz
*Attorney*—George W. F. Simmons and Carl A. Castellan

[57] ABSTRACT

Novel compounds which belong to the class of N-(1,1-dimethyl-2-alkynyl)-3,5-disubstituted and 3,4,5-trisubstituted benzamides. These compounds are potent herbicides.

1 Claim, No Drawings

N-(1,1-DIMETHYL-2-BUTYNYL)-3,5-DICHLOROBENZAMIDE

The novel compounds of this invention are N-(1,1-dimethyl-3-alkylpropynyl)-3,5-disubstituted and 3,4,5-trisubstituted benzamides and may be structurally represented by the formula

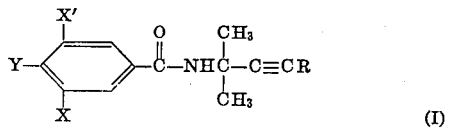

wherein R is an alkyl or haloalkyl group of one to five carbon atoms;

X and X' are individually selected from the group consisting of Br, Cl, F, $CH_3$ and $CF_3$; and Y is hydrogen, Cl, F or $CH_3$.

These compounds are excellent herbicides possessing both preemergence and postemergence activity.

Typical compounds within the scope of Formula I include the following:

N-(1,1-dimethyl-2-butynyl)-3,5-dichlorobenzamide
N-(1,1-dimethyl-2-pentynyl)-3,5-dichlorobenzamide
N-(1,1,4-trimethyl-2-pentynyl)-3,5-dichlorobenzamide
N-(1,1,4-trimethyl-2-pentynyl)-3,5-dimethylbenzamide
N-(1,1-dimethyl-2-hexynyl)-3,5-dichlorobenzamide
N-(1,1-dimethyl-2-butynyl)-3,5-dimethylbenzamide
N-(1,1-dimethyl-2-pentynyl)-3,5-dimethylbenzamide
N-(1,1-dimethyl-2-octynyl)-3,5-dichlorobenzamide
N-(1,1-dimethyl-2-butynyl)-3-chloro-5-bromobenzamide
N-(1,1-dimethyl-2-butynyl)-3-chloro-5-fluorobenzamide
N-(1,1-dimethyl-2-butynyl)-3-chloro-5-methylbenzamide
N-(1,1-dimethyl-2-butynyl)-3-chloro-5-trifluoromethylbenzamide
N-(1,1-dimethyl-2-butynyl)-3-methyl-5-trifluoromethylbenzamide
N-(1,1-dimethyl-2-butynyl)-3,4,5-trichlorobenzamide
N-(1,1-dimethyl-2-butynyl)-3,5-dichloro-4-fluorobenzamide
N-(1,1-dimethyl-2-butynyl)-3,5-dichloro-4-methylbenzamide
N-(1,1-dimethyl-2-butynyl)-3,4,5-trimethylbenzamide
N-(1,1-dimethyl-2-butynyl)-3,4-dimethyl-5-chlorobenzamide
N-(1,1-dimethyl-3-cyclopropyl-2-propynyl)-3,5-dichlorobenzamide
N-(1,1-dimethyl-3-cyclobutyl-2-propynyl)-3,5-dimethylbenzamide Belgian Pat. No. 709,137 and Netherlands Pat. Application No. 68,00322 (basic Derwent Agdoc Number H-2940) describe novel compounds of the structure

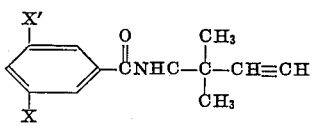

wherein X and X' are Br, Cl, F or $CH_3$ which are excellent herbicides. Such a structure performs better in a cold climate, thought, at least in part, to be due to a temperature-dependent susceptibility to a rearrangement to a herbicidally inactive derivative. In contrast the compounds of the present invention are of more general use, particularly in warmer climates.

These compounds may be prepared by the amidation of an acid derivative, such as the acid halide or anhydride, with the appropriate amine. The following equation using the acid chloride as typical is illustrative of the reaction.

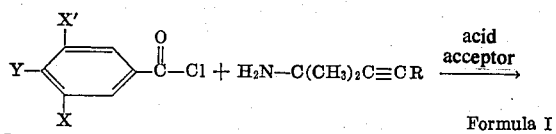

Formula I

The benzoic acids and their derivatives are well-known structures in the art.

The amine starting materials may be prepared by the method of Dillard and Easton, J. Org. Chem. 31, 122 (1966). The general method is reaction of 2-amino-2-methylbut-3-yne with sodamide in liquid ammonia followed by reaction with an alkyl halide, i.e. RX.

In preparing the N-(1,1-dimethyl-2-alkynyl)-3,5-disubstituted and 3,4,5-trisubstituted benzamides of this invention, equal molar ratios of the acid or acid derivative and amine reactants are preferred although a molar excess of amine up to 1:2.5 may be employed. When the acyl halide is used, an acid acceptor such as a tertiary amine, an alkali metal hydroxide or an alkaline earth oxide, hydroxide or carbonate is preferred. Representative acid acceptors are sodium hydroxide, calcium carbonate, pyridine, triethylamine, benzyldimethylamine and magnesium oxide. Although not required, an inert organic solvent of the hydrocarbon, halogenated hydrocarbon, ketone or ether classes of solvents is desirable. Suitable solvents are toluene, ethylene dichloride, octane, methyl isobutyl ketone and commercial hydrocarbon mixtures boiling in the range of 90° to 125° C. The amidation reaction may be accomplished in the range of 0° to 50° C., with 10° to 20° C. being preferred. The time of reaction is not critical, but it is usually completed within 1 to 3 hours. While the preferred method of amidation is to employ the acyl halide, the anhydride also gives suitable results. The salt formed from the amine and the free acid may be converted to the benzamide by the action of dehydrating agents. The benzamides may also be produced by transamidation of suitable esters with the amine.

Details of preparing typical compounds of this invention are given in the following examples which are presented for purposes of illustration and are not intended to limit the scope of the invention.

EXAMPLE 1

Preparation of N-(1,1-dimethyl-2-butynyl)-3,5-dichlorobenzamide

A solution of 8.4 g. (0.04 mole) of 3,5-dichlorobenzoyl chloride in 40 ml. of ether was added dropwise over 20 minutes to a mixture of 4.5 g. (0.042 mole) of 2-methyl-2-amino-pent-3-yne, 3 ml. of water, 3.2 g. (0.04 mole) of 50 percent aqueous sodium hydroxide and 20 ml. of ether with stirring and cooling maintaining the temperature at less than 20° C. The mixture was stirred an additional 30 minutes at 20° C. The ether layer was then separated, washed with water, dried with magnesium sulfate and the ether removed. The residue was recrystallized from a hexane/benzene mixture to give 9.1 g. of white solid melting at 126°–127° C. This was found by analysis to contain 57.6 percent C, 4.9 percent H, 5.1 percent N, 26.4 percent Cl and 6.2 percent O; calculated for $C_{13}H_{13}Cl_2NO$ is 57.8 percent C, 4.8 percent H, 5.2 percent N, 26.2 percent Cl and 5.9 percent O. The product was an 82 percent yield of N-(1,1-dimethyl-2-butynyl)-3,5-dichlorobenzamide.

EXAMPLE 2

Preparation of N-(1,1-dimethyl-2-butynyl)-3,5-dibromobenzamide

When an equimolar quantity of 3,5-dibromobenzoyl chloride was substituted in Example 1 for the 3,5-dichlorobenzoyl chloride, there was isolated a white solid melting at 129°–131° C. This was found by analysis to contain 43.9 percent C, 3.6 percent H, 3.9 percent N, 44.5 percent Br and 4.5 percent O; calculated for $C_{13}H_{13}Br_2NO$ is 43.5 percent C, 3.6 percent H, 3.9 percent N, 44.5 percent Br and 4.4 percent O. It was 53.6 percent yield of N-(1,1-dimethyl-2-butynyl)-3,5-dibromobenzamide.

EXAMPLE 3

Preparation of N-(1,1-dimethyl-2-butynyl)-3,5-dimethylbenzamide

When an equimolar amount of 3,5-dimethylbenzoyl chloride was substituted in Example 1 for the 3,5-dichlorobenzoyl chloride, there was isolated a white solid melting 122°–124° C. It was found by analysis to contain 78.9 percent C, 8.3 percent H, 5.8 percent N and 7.0 percent O; calculated for $C_{15}H_{19}NO$ is 78.6 percent O, 8.3 percent H, 6.1 percent N and 7.0 percent O. The product was a 73.9 percent yield of N-(1,1-dimethyl-2-butynyl)-3,5-dimethylbenzamide.

EXAMPLE 4

Preparation of N-(1,1-dimethyl-2-butynyl)-3,5-dichloro-4fluorobenzamide

When an equimolar amount of 3,5-dichloro-4-fluorobenzoyl chloride was substituted in Example 1 for the 3,5-dichlorobenzoyl chloride, there was isolated a white solid melting at 115.5° – 117° C. It was found to contain by analysis 54.0 percent C, 4.2 percent H, 24.8 percent Cl, 6.5 percent F and 4.7 percent N; calculated for $C_{13}H_{12}Cl_2FNO$ is 54.2 percent C, 4.2 percent H, 24.6 percent Cl, 6.6 percent F and 4.9 percent N. The product was an 87 percent yield of N-(1,1-dimethyl-2-butynyl)-3,5-dichloro-4-fluorobenzamide.

EXAMPLE 5

Preparation of N-(1,1-dimethyl-2-heptynyl)-3,5-dichlorobenzamide.

2-Methyl-2-amino-oct-3-yne was made by the general method of Dillard and Easton cited above. For this 2-amino-2-methylbut-3-yne was reacted with sodamide in liquid ammonia followed by reaction with n-butyl bromide. The resulting 2-methyl-2-amino-oct-3-yne distilled at 75°–80° C. at 20 mm. pressure.

When an equimolar amount of 2-methyl-2-amino-oct-3-yne was substituted in Example 1 for the 2-methyl-2-amino-pent-3-yne there was obtained a white solid melting at 92.5°–93.5° C. This was found by analysis to contain 61.6 percent C, 6.1 percent H, 4.3 percent N, 22.1 percent Cl and 6.0 percent O; calculated for $C_{16}H_{19}Cl_2NO$ is 61.5 percent C, 6.1 percent H, 4.5 percent N, 22.7 percent Cl and 5.1 percent O. The product was a 47.5 percent yield of N-(1,1-dimethyl-2-heptynyl)-3,5-dichlorobenzamide.

The compounds of this invention were evaluated in a standard greenhouse test known as a preliminary evaluation. For these tests seeds of selected crops and weeds were planted in soil in pots. For preemergence tests, these pots were treated immediately with the test compound. For postemergence tests, the seeds were allowed to germinate and the plants to grow for 2 weeks at which time they were treated by foliar application with the test chemical. In both types of test the rate of application was 10 pounds per acre (11 kilos per hectare). Four types of monocotyledonous plants were used and these were wild oat (*Avena fatua*), millet (*Setaria italica*), ryegrass (*Lolium perenne*) and sorghum (*Sorghum vulgare*). Four types of dicotyledonous plants were used and these were curly dock (*Rumex crispus*), velvetleaf (*Abutilon Theophrasti*), flax (*Linum usitatissimum*) and tomato (*Lycopersicon esculentum*). About 2 weeks after application of the test compounds, the state of growth and the phytotoxic effects were evaluated. Table I gives the results.

TABLE I

Preliminary Herbicidal Evaluations (10 lbs./A)

| Plant Species | % Kill with | | | | |
|---|---|---|---|---|---|
| | Ex. 1 | Ex. 2 | Ex. 3 | Ex. 4 | Ex. 5 |
| A) Preemergence tests | | | | | |
| wild oat | 100 | 80 | 100 | 90 | 100 |
| millet | 90 | 90 | 100 | 90 | 40 |
| ryegrass | 100 | 100 | 100 | 100 | 100 |
| sorghum | 90 | 100 | 100 | 90 | 0 |
| curly dock | 100 | 100 | 100 | 100 | 100 |
| velvetleaf | 90 | 100 | 100 | 60 | 0 |
| flax | 100 | 100 | 100 | 100 | 100 |
| tomato | 100 | 100 | 100 | 90 | 50 |
| B) Postemergence tests | | | | | |
| wild oat | 50 | 30 | 95 | 30 | 30 |
| millet | 10 | 80 | 70 | 30 | 50 |
| ryegrass | 20 | 60 | 60 | 80 | 70 |
| sorghum | 0 | 30 | 70 | 0 | 40 |
| curly dock | 30 | 70 | 100 | 90 | 100 |
| velvetleaf | 40 | 50 | 90 | 40 | 90 |
| flax | 80 | 60 | 60 | 90 | 80 |
| tomato | 60 | 100 | 100 | 90 | 90 |

Similar preemergence and postemergence greenhouse tests were then run in a secondary type test using a lower rate of application and more plant species planted in flats. For this test the amount of toxicant was 4 pounds per acre (4.4 kilos per hectare). The plant species used were:

| Monocotyledonous Plant | Botanical Name |
|---|---|
| crabgrass | Digitaria sanguinalis |
| millet | see above |
| wheat | Triticum aestivum |
| ryegrass | see above |
| wild oat | see above |
| Sudan grass | Sorghum sudanensis |
| barnyard grass | Echinochloa crusgalli |
| rice | Oryza sativa |
| corn | Zea mays |

| Dicotyledonous Plant | Botanical Name |
|---|---|
| mustard | Brassic kaber |
| wild carrot | Daucus carota |
| lambsquarter | Chenopodium album |
| curly dock | see above |
| velvetleaf | see above |
| pigweed | Amaranthus retroflexus |
| soybean | Glycine max |
| flax | see above |
| alfalfa | Medicago sativa |
| tomato | see above |
| cotton | Gossypium hirsutum |

Table II gives the results.

TABLE II

Secondary Herbicidal Evaluations (4 lbs./A)

A) Preemergence tests

| Plant Species | % Kill with | | | | |
|---|---|---|---|---|---|
| | Ex. 1 | Ex. 2 | Ex. 3 | Ex. 4 | Ex. 5 |
| crabgrass | 95 | 98 | 95 | 99 | 40 |
| millet | 95 | 90 | 90 | 99 | 20 |
| wheat | 30 | 20 | 0 | 0 | 0 |
| ryegrass | 95 | 90 | 90 | 90 | 0 |
| wild oat | 90 | 70 | 60 | 90 | 0 |
| Sudan grass | 90 | 70 | 60 | 80 | 0 |
| barnyard grass | 90 | 90 | 90 | 90 | 0 |
| rice | 70 | 0 | 90 | 0 | 0 |
| corn | 80 | 20 | 40 | 0 | — |
| mustard | 20 | 0 | 0 | 60 | 0 |
| wild carrot | 10 | 0 | 0 | 0 | 0 |
| lambsquarter | 90 | 70 | 30 | 70 | 30 |
| curly dock | 60 | 50 | 70 | 80 | 50 |
| velvetleaf | 60 | 0 | 50 | 60 | 0 |
| pigweed | 90 | 50 | 80 | 60 | 30 |
| soybean | 0 | 0 | 0 | 0 | 20 |
| flax | 80 | 80 | 40 | 90 | 0 |
| alfalfa | 0 | 0 | 10 | 0 | 0 |
| tomato | 70 | 50 | 60 | 95 | 0 |
| cotton | 20 | 0 | 20 | 0 | — |

B) Postemergence tests

| | Ex. 1 | Ex. 2 | Ex. 3 | Ex. 4 | Ex. 5 |
|---|---|---|---|---|---|
| crabgrass | 70 | 60 | 50 | 0 | 0 |
| millet | 30 | 0 | 20 | 30 | 0 |
| wheat | 20 | 0 | 0 | 30 | 0 |
| ryegrass | 20 | 0 | 0 | 0 | 0 |
| wildoat | 30 | 0 | 10 | 10 | 0 |
| Sudan grass | 0 | 0 | 0 | 20 | 0 |
| barnyard grass | 50 | 70 | 0 | 0 | 0 |
| rice | 0 | 0 | 0 | 0 | 0 |
| corn | 20 | 20 | 10 | 20 | 0 |
| mustard | 70 | 80 | 50 | 20 | 0 |
| wild carrot | 50 | 60 | 0 | 0 | 0 |
| lambsquarter | 70 | 60 | 80 | 20 | 0 |
| curly dock | 50 | 60 | 50 | 70 | 0 |
| velvetleaf | 50 | 30 | 30 | 0 | 0 |
| pigweed | 70 | 80 | 80 | 20 | 0 |
| soybean | 0 | 10 | 10 | 30 | 10 |
| flax | — | — | — | 60 | 40 |
| alfalfa | 30 | 10 | 10 | 0 | 0 |
| tomato | 20 | 20 | 20 | 70 | 0 |
| cotton | 20 | 20 | 0 | 0 | — |

A preemergence type test similar to that above was run except that the test compound was incorporated into the soil and fewer dicotyledonous species were used.

In carrying out this test the seeds were planted in soil in flats, covered with a piece of cheese cloth and then with about three-fourths inch of soil. This was then sprayed with the compound at a rate of 4 lbs. per acre. The compound was then incorporated into the upper three-fourths inch of soil by lifting up the cheese cloth and mixing the soil in it. The impregnated soil was replaced over the seed and the evaluation continued as for a regular preemergence test. Table III gives the results.

TABLE III

Herbicidal Evaluations by Soil Incoroporation

| Plant Species | % Kill with | | | | |
|---|---|---|---|---|---|
| | Ex. 1 | Ex. 2 | Ex. 3 | Ex. 4 | Ex. 5 |
| crabgrass | 100 | 100 | 100 | — | 0 |
| millet | 90 | 80 | 90 | 100 | 90 |
| wheat | 90 | 30 | 40 | 40 | 0 |
| ryegrass | 100 | 100 | 100 | 100 | 90 |
| wild oat | 80 | 80 | 80 | 90 | 80 |
| Sudan grass | 90 | 60 | 90 | 80 | 40 |
| barnyard grass | 100 | 100 | 100 | 100 | 0 |
| rice | 70 | 30 | 20 | 40 | 20 |
| corn | 90 | 80 | 90 | 80 | 0 |
| wild carrot | 50 | 50 | 60 | 50 | 90 |
| curly dock | 100 | 100 | 100 | 100 | 100 |
| velvetleaf | 90 | 0 | 0 | 40 | 0 |
| soybean | 0 | 0 | 20 | 0 | 0 |
| flax | 90 | 80 | 100 | 80 | 80 |
| alfalfa | 70 | 50 | 80 | 30 | 0 |
| cotton | 0 | 0 | 0 | 40 | 0 |
| pea (Pisum arvense) | 0 | — | 0 | — | 0 |

A type of plant growth regulation test was conducted which showed that the compounds of this invention were more persistent than closely related compounds of the art. To demonstrate this, N-(1,1-dimethyl-2-butynyl)-3,5-dichlorobenzamide (a compound of this invention designated Compound A) was compared with N-(1,1-dimethypropynyl)-3,5-dichlorobenzamide (a prior art compound designated Compound B). These two compounds were individually mixed with soil at a concentration by weight of 10 parts per million. One lot of soil for each compound was stored at 25° C. and a second lot at 37° C. At the time of the soil preparation and every 10 days thereafter a 50 g. aliquot of soil from each lot was extracted with methanol using a Soxlet extractor. The methanol extract was concentrated to dryness, the residue was taken up in 5 ml. of acetone and then diluted with water to a volume of 100 ml. Successive dilutions were made by taking 50 ml. of each preceding test solution and diluting with water to 100 ml. A total of twelve such dilutions were made for each extract. Each dilution constitutes a test solution and was evaluated for its plant growth regulating activity by observing the inhibition on the growth of roots of wheat. For this test a filter paper was placed in the bottom of a Petri dish and watered with 5 ml. of the test solution. Ten wheat seeds were then placed on the paper, the dish was covered and allowed to stand on the laboratory bench for 5 days. The state of growth of the roots of the seedlings was visually observed and compared to seedlings which had been similarly treated with a known amount of the compound ranging from 2.5 $\mu$ g. to 0.05 $\mu$ g. per Petri dish, and with a water control. It was determined that a 0.25 $\mu$ g. quantity of either test compound could be detected in four days by this test. From this test the following was concluded. More than 80 percent of the original amount of Compound A remained unchanged and was herbicidally available after 40 days in soil at either 25° C. or 37° C. On the other hand Compound B was gradually lost and no more than 25 percent of the original amount was herbicidally available after 40 days storage at 25° C. and less than 10 percent was herbicidally available after storage for 40 days at 37° C.

The difference in volatility as a measure of persistence between Compounds A and B was measured biologically. For this test a glass battery jar was used. In the bottom of the jar was placed a Petri dish containing a filter paper moistened with 5 ml. of water and 10 wheat seeds. Another Petri dish was prepared by putting 100 $\mu$l. of an acetone solution containing a known amount of the test compound onto a filter paper in the bottom of the Petri dish and allowing it to dry for one-half hour. This Petri dish was then placed on a glass stand inside the battery jar approximately one-third of the way from the top. The jar was then tightly covered with a thin sheet of polyethylene and allowed to stand on the bench for 5 days. A visual comparison was made of the growth of the roots of the wheat seedlings for each comparable amount of the two compounds. It was found that the effect on the roots was such that it required at least five times the quantity of Compound A to give an effect equal to that of Compound B. This demonstrates the more rapid vapor transfer and loss of Compound B as compared to Compound A.

Compounds A and B were compared for chemical stability by treatment in aqueous ethanol at room temperature and at temperatures between room temperature and reflux with hydrochloric acid, sodium hydroxide or silver nitrate. The half life of Compound A under these conditions was at least one hundred times longer than that of Compound B.

The above evaluations show that the compounds of this invention are far more stable and thus are more persistent and residual under a variety of conditions than the most closely related compounds of the prior art. Accordingly, the compounds of this invention are useful as herbicides under conditions, particularly in warmer climates, for which the compounds of the prior art are not adaptable.

The compositions of the invention comprise an N-(1,1-dimethyl-2-alkynyl)-3,5-disubstituted or 3,4,5-trisubstituted benzamide together with an agronomically acceptable carrier. By "an agronomically acceptable carrier" is meant any substance which can be used to dissolve, disperse, or diffuse the chemical within it, without impairing the effectiveness of the toxic agent, which is not permanently deleterious to the soil in any chemical or physical manner and which is usually nonphytocidal to the agricultural crops to be protected. The compositions may be in the form of solutions, emulsifiable concentrates, wettable powders, granules, or dusts. One or more liquid or solid carriers may be used for a particular herbicidal composition.

An emulsifiable concentrate is made by dissolving an N-(1,1-dimethylalkynyl) benzamide in a solvent to which one or more surfactants are added. Suitable solvents or liquid carriers for use in preparing these emulsifiable concentrates may, for example, be found in the hydrocarbon and ketone classes of organic solvents such as xylene, acetone, isophorone, mesityl oxide, cyclohexanone and mixtures of these. Preferred solvents are ketone-hydrocarbon mixtures such as isophorone-xylene. The emulsifying agents used are surfactants of the anionic, cationic, or non-ionic types and mixtures thereof. Representative of the anionic surfactants are fatty alcohol sodium sulfates, calcium alkylbenzenesulfonates and sodium dialkyl sulfosuccinates. Representative of the cationics are (higher alkyl) dimethylbenzylammonium chlorides. Representative of the nonionics are condensation products of alkylene oxides with fatty alcohols, alkyl phenols, mercaptans, amines or fatty acids, such as dinonylphenoxypolyethoxyethanol in which there are 8 to 100 ether groupings and similar polyethoxy compounds prepared with other hydrophilic groupings, including esters of long chain fatty acids and mannitan or sorbitan, which are reacted with ethylene oxide.

The following compositions are typical of emulsifiable concentrate formulations when solvents are use.

|  | Parts/100 Parts Total |
| --- | --- |
| N-(1,1-dimethylalkynyl) benzamide | 10 to 35 |
| Solvent | 55 to 88 |
| Emulsifying agent | 2 to 10 |

Wettable powder formulations comprise an N-(1,1-dimethylalkynyl) benzamide admixed in a solid carrier along with a surface active agent(s) which gives this type of formulation its wettability, dispersibility and spreading characteristics. Solid carriers which are suitable for preparing these wettable powder formulations are those which have been rendered agronomically suitable by pulverizing devices and may be organic or inorganic in nature. Suitable organic carriers are soybean, walnut or wood flower or tobacco dust; and suitable inorganic ones are clays of the montmorillonite (bentonite), kaolinite or fuller's earth types; silicas such as diatomaceous earth and hydrated silica; silicates such as talc, pyrophyllite, or alkaline earth silicates, and calcium and magnesium carbonates. A surfactant or mixture of surfactants is added to the wettable powder formulation. Suitable dispersing agents are sodium lignin sulfonate, sodium formaldehyde-naphthalene sulfonate, or sodium N-methyl-N-higher alkyl taurates. Wetting agents useful for this purpose include higher alkylaryl sulfonates such as calcium dodecylbenzenesulfonate, long-chain alcohol sulfates, sodium alkylphenoxypolyethoxyethyl sulfonates, sodium dioctyl sulfosuccinate, and ethylene oxide adducts with fatty alcohols or with higher alkylphenols, such as octylphenoxypolyethoxyethanol in which there are eight to 80 ether groupings and similar polyethoxy compounds made from stearyl alcohol. Operative spreading or adhesive agents include glycerol mannitan laurate or a condensate of polyglycerol and oleic acid modified with phthalic anhydride. Additionally, many of the surfactants discussed above function as spreading and adhesive agents. The active ingredient content of the wettable powders may be in the range of about 20 to 80 percent; however, the preferred range of concentration is 50 to 75 percent.

The following compositions are typical for wettable powder formulations:

|  | Parts/100 Parts Total |
|---|---|
| N-(1,1-dimethylalkynyl) benzamide | 20 to 80 |
| Carrier | 10 to 79 |
| Surfactants | 1 to 10 |

Dust concentrates are made by incorporating an N-(1,1-dimethylalkynyl) benzamide of this invention into a solid carrier such as finely powdered clays, talc, silica and synthetic silicates, alkaline earth carbonates and diluents of natural origin, such as tobacco dust or walnut shell flour. Granular formulations are made from similar type solid carriers except that the particle size is larger, in the range of 15 to 60 mesh. A small amount of dispersing agent may be incorporated into these solid formulations. The concentration of active ingredients in these dust or granular formulations may be in the range of 2 to 15 percent.

It will be seen from the above that the compositions of this invention may contain 20 percent to 98 percent of carrier based on the total weight of the composition, depending on whether it is in the form of a solution, an emulsifiable concentrate, a wettable powder, a dust or a granular formulation. Solutions containing a relatively high percentage of the active ingredient are used for applications by a low volume technique.

A particularly convenient method for making solid formulations is to dissolve the active ingredient in a volatile solvent, such as acetone; apply this solution to the solid carrier with thorough mixing, and then remove the solvent by allowing it to evaporate at either normal or reduced pressure.

Generally the active ingredient is applied at the rate of about 0.5 to 10 or more pounds per acre, with 1 to 4 pounds per acre being preferred.

In some instances it may be desirable to add one or more other pesticides. Other herbicides which can be incorporated to provide additional advantages and effectiveness include:

Carboxylic Acids and Derivatives 2,3,6-trichlorobenzoic acid and its salts
2,3,5,6-tetrachlorobenzoic acid and its salts
2-methoxy-3,5,6-trichlorobenzoic acid and its salts
2-methoxy-3,6-dichlorobenzoic acid and its salts
2-methyl-3,6-dichlorobenzoic acid and its salts
2,3-dichloro-6-methylbenzoic acid and its salts
2,4-dichlorophenoxyacetic acid and its salts and esters
2,4,5-trichlorophenoxyacetic acid and its salts and esters
(2-methyl-4-chlorophenoxy)acetic acid and its salts and esters
2-(2,4,5-trichlorophenoxy)propionic acid and its salts and esters
4-(2,4-dichlorophenoxy)butyric acid and its salts and esters
4-(2-methyl-4-chlorophenoxy)butyric acid and its salts and esters
2,3,6-trichlorophenylacetic acid and its salts
3,6-endoxohexahydrophthalic acid
dimethyl 2,3,5,6-tetrachloroterephthalate
trichloroacetic acid and its salts
2,2-dichloropropionic acid and its salts
2,3-dichloroisobutyric acid and its salts Carbamic Acid Derivatives ethyl N,N-di(n-propyl)thiolcarbamate
propyl N,N-di(n-propyl)thiolcarbamate
ethyl N-ethyl-N-(n-butyl)thiolcarbamate
propyl N-ethyl-N-(n-butyl)thiolcarbamate
2-chloroallyl N,N-diethyldithiocarbamate
N-methyldithio-carbamic acid salts
ethyl 1-hexamethyleneiminecarbothiolate
isopropyl N-phenylcarbamate
isopropyl N-(m-chlorophenyl)carbamate
4-chloro-2-butynyl N-(m-chlorophenyl)carbamate
methyl N-(3,4-dichlorophenyl)carbamate Phenols dinitro-o-(sec.-butyl)phenol and its salts
pentachlorophenol and its salts Substituted Ureas 3-(3,4-dichlorophenyl)-1,1-dimethylurea
3-(4-chlorophenyl)-1,1-dimethylurea
3-phenyl-1,1-dimethylurea
3-(3,4-dichlorophenyl)-3-methoxy-1,1-dimethylurea
3-(4-chlorophenyl)-3-methoxy-1,1-dimethylurea
3-(3,4-dichlorophenyl)-1-n-butyl-1-methylurea
3-(3,4-dichlorophenyl)-1-methoxy-1-methylurea
3-(4-chlorophenyl)-1-methoxy-1-methylurea
3-(3,4-dichlorophenyl)-1,1,3-trimethylurea
3-(3,4-dichlorophenyl)-1,1-diethylurea
dichloral urea Substituted Triazines 2-chloro-4,6-bis(ethylamino)-s-triazine
2-chloro-4-ethylamino-6-isopropylamino-s-triazine
2-chloro-4,6-bis(methoxypropylamino)-s-triazine
2-methoxy-4,6-bis(isopropylamino)-s-triazine 2-chloro-4-ethylamino-6-(3-methoxypropylamino)-s-triazine
2-methylmercapto-4,6-bis(isopropylamino)-s-triazine
2-methylmercapto-4,6-bis(ethylamino)-s-triazine
2-methylmercapto-4-ethylamino-6-isopropylamino-s-triazine
2-chloro-4,6-bis(isopropylamino)-s-triazine
2-methoxy-4,6-bis(ethylamino)-s-triazine
2-methoxy-4-ethylamino-6-isopropylamino-s-triazine
2-methylmercapto-4-(2-methoxyethylamino)-6-isopropylamino-s-triazine Diphenyl Ether Derivatives 2,4-dichloro-4'-nitrodiphenyl ether 2,4,6-trichloro-4'-nitrodiphenyl ether
2,4-dichloro-6-fluoro-4'-nitrodiphenyl ether
3-methyl-4'-nitrodiphenyl ether
3,5-dimethyl-4'-nitrodiphenyl ether
2,4'-dinitro-4-trifluoromethyldiphenyl ether

Anilides

N-(3,4-dichlorophenyl)propionamide
N-(3,4-dichlorophenyl)methacrylamide
N-(3-chloro-4-methylphenyl)-2-methylpentanamide
N-(3,4-dichlorophenyl)trimethylacetamide
N-(3,4-dichlorophenyl)-$\alpha,\alpha$-dimethylvaleramide

Uracils 5-bromo-3-s-butyl-6-methyluracil
5-bromo-3-cyclohexyl-1,6-dimethyluracil
3-cyclohexyl-5,6-trimethyleneuracil
5-bromo-3-isopropyl-6-methyluracil
3-tert-butyl-5-chloro-6-methyluracil

Nitriles 2,6-dichlorobenzonitrile
diphenylacetonitrile
3,5-dibromo-4-hydroxybenzonitrile
3,5-diiodo-4-hydroxybenzonitrile

Other Organic Herbicides 2-chloro-N,N-diallylacetamide
N-(1,1-dimethyl-2-propynyl)-3,5-dichlorobenzamide
maleic hydrazide
3-amino-1,2,4-triazole
monosodium methanearsonate
disodium methanearsonate
N,N-dimethyl-$\alpha,\alpha$-diphenylacetamide
N,N-di-(n-propyl)-2,6-dinitro-4-trifluoromethylaniline
N,N-di-(n-propyl)-2,6-dinitro-4-methylaniline
N,N-di-(n-propyl)-2,6-dinitro-4-methylsulfonylaniline
0-(2,4-dichlorophenyl)-0-methyl-isopropylphosphoramidothioate
4-amino-3,5,6-trichloropicolinic acid
2,3-dichloro-1,4-naphthaquinone
di(methoxythiocarbonyl)disulfide
6,7-dihydrodipyrido[1,2-a:2',1'-c]pyrazidinium salts
1,1'-dimethyl-4,4'-bipyridinium salts
3,4,5,6-tetrahydro-3,5-dimethyl-2-thio-2H-1,3,5-thiadiazine

We claim:
1. N-(1,1-dimethyl-2-butynyl)-3,5-dichlorobenzamide.

* * * * *